(12) United States Patent
Hies et al.

(10) Patent No.: US 10,480,971 B2
(45) Date of Patent: Nov. 19, 2019

(54) COMPACT WIDE ANGLE ACOUSTIC TRANSDUCER

(71) Applicant: GWF MessSysteme AG, Lucerne (CH)

(72) Inventors: Thomas Werner Hies, Singapore (SG); Claus-Dieter Ohl, Singapore (SG); Trung Dung Luong, Singapore (SG)

(73) Assignee: GWF MESSSYSTEME AG, Lucerne (CH)

( * ) Notice: Subject to any disclaimer, the term of this patent is extended or adjusted under 35 U.S.C. 154(b) by 200 days.

(21) Appl. No.: 15/496,833

(22) Filed: Apr. 25, 2017

(65) Prior Publication Data

US 2017/0307424 A1 Oct. 26, 2017

Related U.S. Application Data

(63) Continuation of application No. PCT/IB2016/052320, filed on Apr. 25, 2016.

(51) Int. Cl.
| | |
|---|---|
| *G01F 1/66* | (2006.01) |
| *H04R 1/02* | (2006.01) |
| *G10K 11/20* | (2006.01) |
| *G10K 11/16* | (2006.01) |

(52) U.S. Cl.
CPC ............ *G01F 1/662* (2013.01); *G10K 11/161* (2013.01); *G10K 11/20* (2013.01); *H04R 1/02* (2013.01)

(58) Field of Classification Search
CPC ....................................................... G01F 1/662
USPC ...................................................... 73/861.18
See application file for complete search history.

(56) References Cited

U.S. PATENT DOCUMENTS

| | | | |
|---|---|---|---|
| 4,153,894 A * | 5/1979 | Alphonse | ............ G01S 7/52046 181/175 |
| 4,156,863 A | 5/1979 | Cook et al. | |
| 2008/0262512 A1* | 10/2008 | Humayun | ................ A61B 8/10 606/128 |
| 2011/0168484 A1* | 7/2011 | Lenz | ......................... E04B 1/86 181/288 |
| 2012/0123274 A1 | 5/2012 | Ikeda et al. | |
| 2017/0206884 A1* | 7/2017 | Degrandis | ............... G10K 11/20 |

FOREIGN PATENT DOCUMENTS

| | | |
|---|---|---|
| CA | 2753792 A1 | 3/2013 |
| WO | 2012051650 A1 | 4/2012 |
| WO | 2016016818 A1 | 2/2016 |

OTHER PUBLICATIONS

International Search Report with Written Opinion, dated Aug. 9, 2017, for corresponding international application PCT/IB2017/052350.

* cited by examiner

*Primary Examiner* — Walter L Lindsay, Jr.
*Assistant Examiner* — Philipmarcus T Fadul
(74) *Attorney, Agent, or Firm* — Myers Wolin, LLC

(57) ABSTRACT

A transducer is provided for emitting and receiving acoustic waves, a method for operating and a method for producing the same. The transducer comprises a casing that forms a cavity. The casing comprises an excitation surface and an emitting surface, which is arranged opposite to the excitation surface. A transducer element is provided at the excitation surface, and an acoustic diffuser is provided at the emitting surface of the casing, wherein a diffusing structure of the acoustic diffuser faces the cavity.

22 Claims, 11 Drawing Sheets

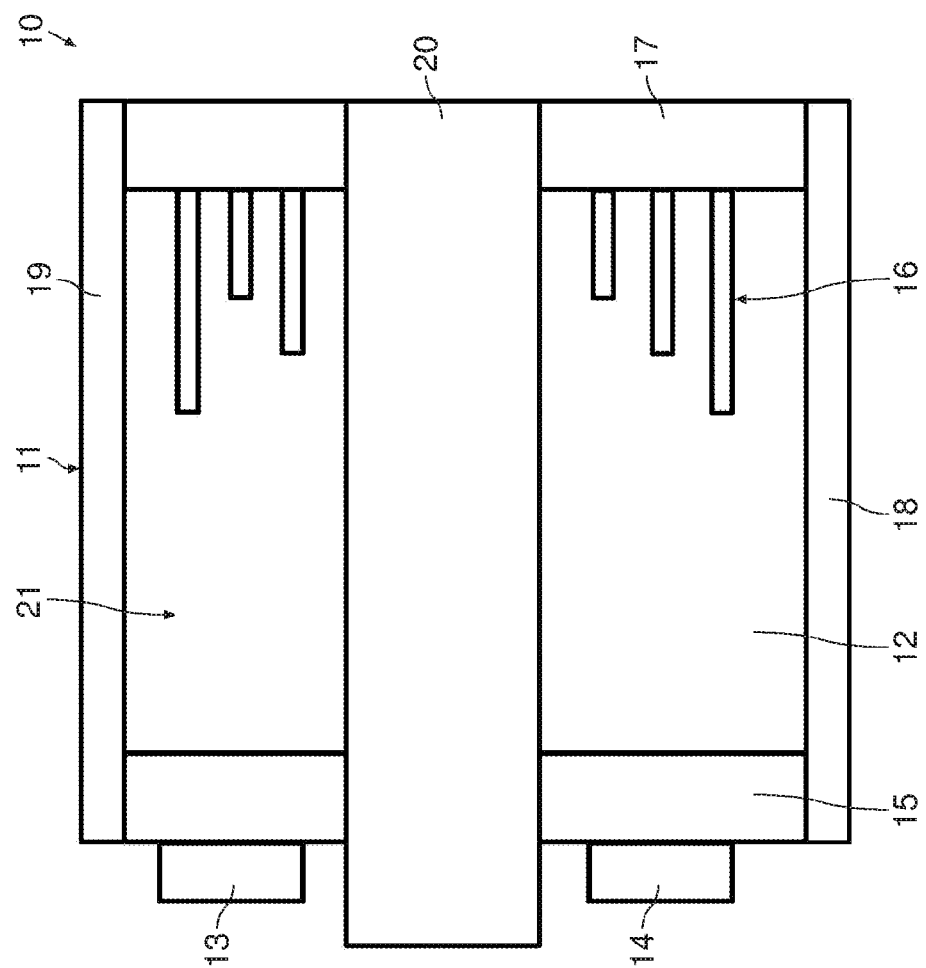

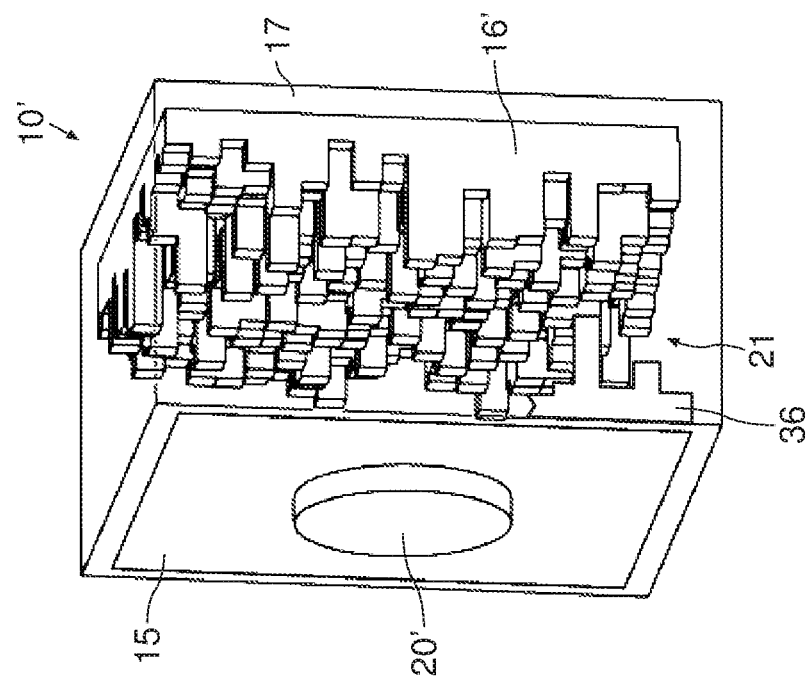
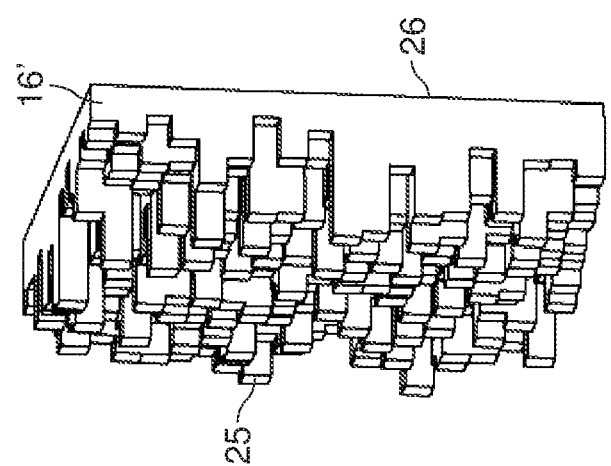

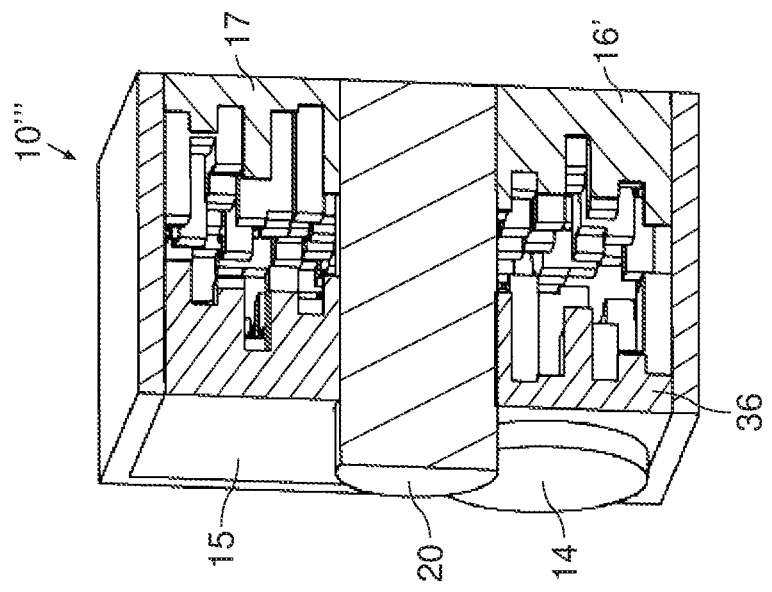
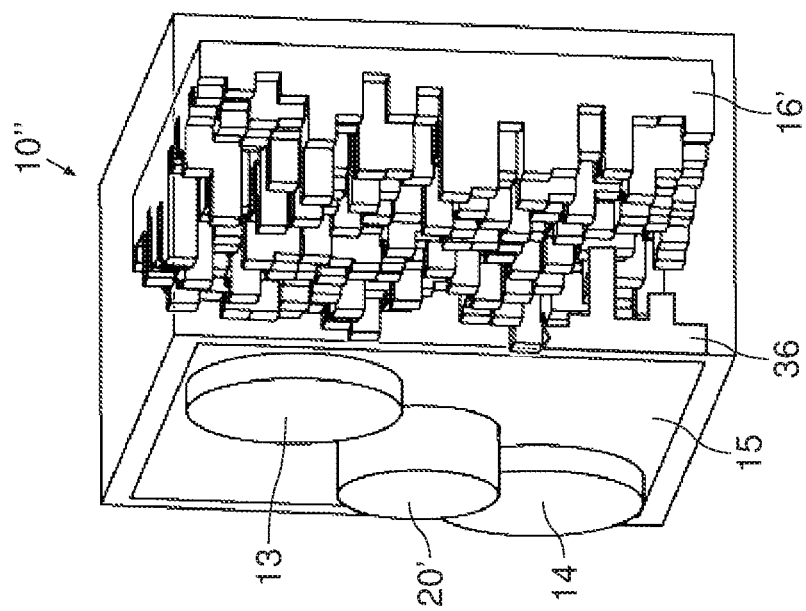

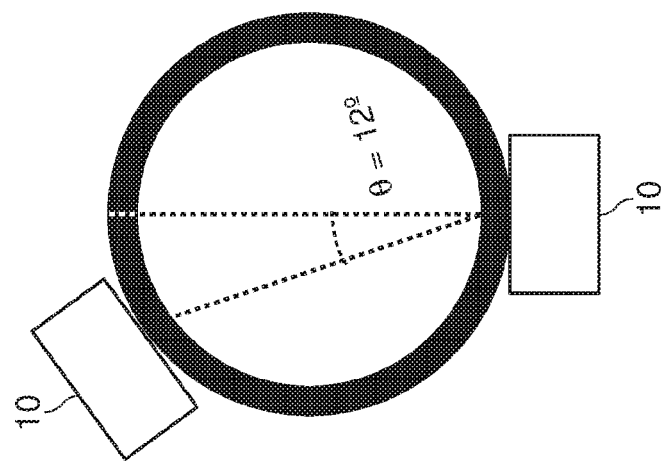
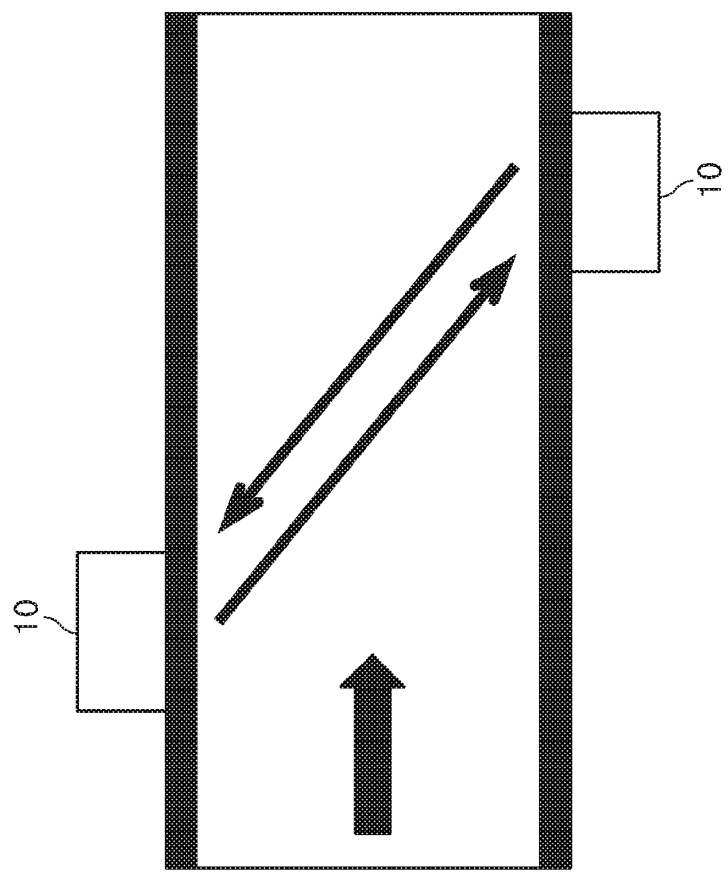
Fig. 12

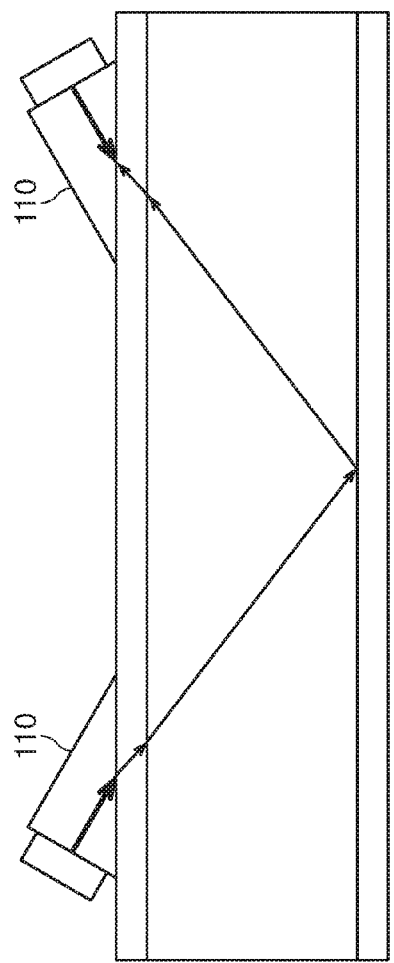
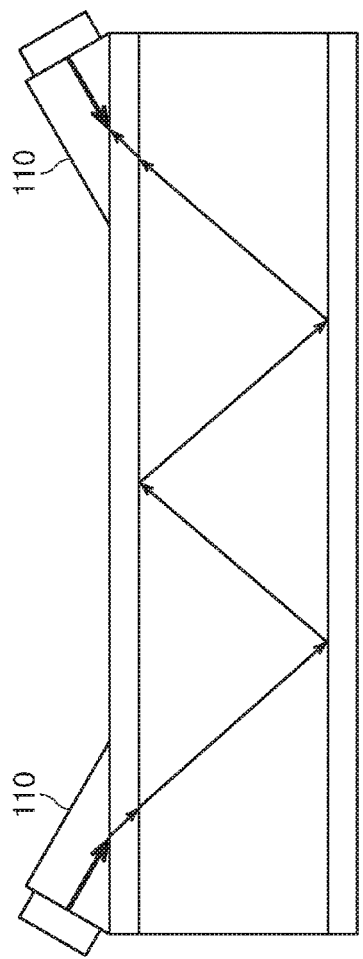

COMPACT WIDE ANGLE ACOUSTIC TRANSDUCER

CROSS-REFERENCE TO RELATED APPLICATIONS

This application is a continuation under 35 U.S.C. § 120 of International Application No. PCT/IB2016/052320, filed Apr. 25, 2016, the contents of each are hereby incorporated by reference in their entirety.

FIELD OF THE INVENTION

The current specification relates to an acoustic transducer for generating a wide angle, extended pressure distribution by making use of diffuse internal reflections.

BACKGROUND

The U.S. Pat. No. 4,156,863 discloses a wide angle, wide bandwidth transducer which emits acoustic signals into a wide region by providing an array of many transducer elements that point radially outward along a curved surface.

SUMMARY OF INVENTION

By contrast, the wide-angle transducer according to the present specification makes use of one or more acoustic diffusers that are provided within a cavity of a casing.

The present specification discloses a transducer for emitting and receiving acoustic waves. The transducer is also referred to as "wide angle transducer". In particular, the acoustic waves, which are emitted and received by the transducer, can be ultrasound waves that are transmitted through a fluid across a closed or an open fluid conduit.

The transducer comprises a casing, which encloses a cavity. In other words, the casing forms or defines a cavity. The cavity of the casing comprises a filling material such as a liquid or a gel, an epoxy material or other plastic material. The filling material provides a coupling from and to the surfaces of the casing. In particular, the filling may fill out an interior space of the cavity essentially completely. The interior space of the cavity is defined by the cavity and any elements that protrude into the cavity. For brevity, the interior space of the cavity is also referred to as cavity where the meaning is apparent from the context or alternatively as "acoustic cavity".

If the filling material or transmitting medium is provided by a liquid or gel, the casing can be made watertight or liquid tight to ensure that no air can be trapped or gel can leak. The casing of the wide-angle transducer comprises an excitation surface and an emitting surface, which is arranged opposite to the excitation surface. In particular, the excitation surface and the emitting surface can be provided parallel to each other and at opposite ends of the casing.

However, the emitting surface may also be tilted with respect to the excitation surface. Furthermore, the excitation surface and the emitting surface can be provided as plane surfaces. In other embodiments, the emitting surface or the excitation surface may be curved, for example to conform with a shape of round conduit.

In particular, an exterior portion of the excitation surface or the emitting surface can be provided as plane surface or as curved surface. The interior space of the casing in which the one or more diffusers are provided can have a particularly simple shape, which is easy to manufacture, such as a cuboid or a cylinder, in particular a circular cylinder. A cuboid is particularly suitable for fitting a diffuser with a rectangular base surface into the casing. In one embodiment, the casing has the shape of a cuboid and the emitting surface and the excitation surface are provided as opposite surfaces of the cuboid.

By way of example, the casing can be made from plastic material or it can also be made from a metallic material. The transducer comprises at least one ultrasound transducer element, which is coupled to or provided at the excitation surface of the casing. For example, the transducer element can be inserted through the excitation surface and/or it can be welded, soldered or glued to the excitation surface. By way of example, the traducer element or the transducer elements may be connected to the excitation surface by press fit or by form fit. The transducer element or the transducer elements are accessible from the exterior of the casing and can be connected to electric cables for providing an excitation signal to the transducer element or elements or for transmitting a received signal.

An acoustic diffuser is provided at the emitting surface of the casing. A diffusing structure of the acoustic diffuser faces the cavity. In other words, the diffusing structure protrudes into the interior space defined by the cavity.

For an even better diffusion of the sound waves within the cavity, a second diffuser can be provided. In particular, the second diffuser can be provided opposite to the first diffuser and such that a diffusing structure of the second acoustic diffuser faces a diffusing structure of the first acoustic diffuser. The diffusing structures are facing each other or point towards each other in the sense that there is a line of sight between the diffusing structures.

In particular, the diffusing structures can be arranged relative to each other such that respective mean directions, which are defined by the diffusing structures, point in opposite directions within a predetermined angle, such as 10 degrees, 20 degrees or 45 degrees. For example, two column type diffusing structures can be arranged such that the columns of the first diffusing structure point towards the columns of the second diffusing structure within a predetermined angle, such as 10 degrees, 20 degrees or 45 degrees. Specifically, the acoustic diffusers can be arranged such that respective base surfaces of the acoustic diffusers are aligned in parallel.

The respective alignments and the distance of the diffusing structures from each other can be chosen such that a major portion of the sound emitted by one of the diffusers is received by the other diffuser. Thereby, an effective coupling between the diffusers is provided. For example, a distance between two column type diffusing structures can be such that a minimum distance between the diffusing structures is no more than 10%, 20% or 50% of a maximum height difference between the columns.

A base surface of the diffuser may cover the emitting surface or the excitation surface essentially completely. Similarly, the respective diffusing structure may cover the emitting surface or the excitation surface essentially completely. Specifically, "essentially completely" may refer to 90% or more, 95%, or 99% or more of the emitting surface or of the excitation surface.

In particular, the diffusing structure can be realized by protrusions or by a superstructure on a base surface of the respective acoustic diffuser, such as walls or columns, which are aligned orthogonal to the base surface or at an angle to the base surface.

The second acoustic diffuser is provided or attached to the excitation surface such that a diffusing structure of the second acoustic diffuser faces towards the cavity. The second diffuser can be of the same type as the first diffuser or it can be of a different type. By way of example, the diffusers can be attached to the respective surface or to the casing by welding, gluing, screws, bolts, form fit or press fit.

By way of example, the excitation surface or the emitting surface can be provided by a portion of the casing or by a portion of the casing and further elements that are attached to the casing. Furthermore, the respective acoustic diffusers can be provided at an internal portion of the respective excitation surface or at an internal portion of the casing.

The casing may comprise openings for exchanging the liquid or gel and for degassing purposes. Furthermore, the casing may comprise a lid on one side for the purpose of inserting or exchanging the acoustic diffuser. In one embodiment, the lid is glued or welded to the casing. According to another embodiment, the lid is fastened by screws. In the latter case, a sealing or gasket may be provided, such as a seal ring or similar.

In particular, the diffusing structure of the acoustic diffuser or the diffusing structures of the acoustic diffusers may comprise a column type diffusing structure. More specifically, the diffusing structure or the diffusing structures may consist of or may be provided by a column type diffusing structure. The column-type diffuser structure is also known as terrain structure, wherein columns of the column type diffuser have a statistically distributed height. In this case, the diffuser is also referred to as column-type diffuser.

The statistically distributed height can be defined by a predetermined algorithm and the probability of a given height may depend on the location on the base surface, which can be specified by rectangular coordinates x and y. Or, the probability of a given height may also depend on a distance from a location on the base surface of the diffusing structure or of the acoustic diffuser.

In general, the base size, the height of the columns and other dimensions depend on the ultrasonic wavelength. According to one embodiment, a base size of the columns of a column-type acoustic diffuser is between 0.5 square millimeters and 1.6 square millimeters. In particular, a column cross section can be rectangular or square shaped and the size of the cross section can be between 0.75 mm×0.75 mm and 1.25 mm×1.25 mm. Furthermore, the column cross section can be the same from the base to the top of the columns, whereby the base size is the same as the cross section size.

According to a further embodiment, a base size of the columns of a column type acoustic diffuser is between 3 square millimeters and 5 square millimeters. In particular, a column cross section can be rectangular or square shaped and the size of the cross section can be between 1.75 mm×1.75 mm and 2.25 mm×2.25 mm.

The height range of the columns depends on the applied ultrasonic wavelength. In a specific example, a height range between the smallest and the largest column of the acoustic diffuser can be chosen between 1 mm and 10 mm. For a good diffusion effect the height structure of the second diffuser can be chosen different from the height structure of the first diffuser, for example the column heights of one diffuser can be statistically independent of the column heights of the respective other diffuser.

According to a further embodiment, the diffusing structure of the acoustic diffuser or the diffusing structures of the acoustic diffusers comprises or comprise a chamber type diffusing structure, such as a quadratic residue or Schroeder diffusor or a cubic residue diffuser.

In the case of two acoustic diffusers, "the diffuser or the diffusers" can refer to one of the diffusers or to both of them. In the case of more than two acoustic diffusers it can refer to one of them, some of them or all of the diffusers. The same applies to the expression "the diffusing structure or the diffusing structures". Furthermore, the material or method of production of the diffuser can also refer to the material or the method of production of the diffusing structure only.

According to one embodiment, the acoustic diffuser or the acoustic diffusers is made or are made from a metallic material. A metallic material can be durable and provides a good acoustic coupling.

According to a further embodiment, the acoustic diffuser or the acoustic diffusers is made or are made from a plastics material. In particular, the diffuser or the diffusers can be made from a plastic material in a moulding process.

According to a further embodiment, the acoustic diffuser or the acoustic diffusers is made or are made by a 3D printing process. The 3D printing process is especially suitable in connection with a column-type diffuser. The 3D printing process can be a 3D metal printing process of a 3D printing process using another type of material. The choice of material depends on the application purpose and the acoustic impedance of the fluid, such as gas, oil, water, etc.

In particular, the cavity in which the diffuser or the diffusers are provided can be a rectangular cavity or a cuboid shaped cavity. In this way, the cavity can be provided by the interior space of a rectangular or cuboid shaped casing, for example.

Furthermore, the transducer can comprise a transducer element that is in contact with the emitting surface, which is provided for picking up a signal from the emitting surface. For example, this transducer element can be provided by a needle transducer, which is in contact with the emitting surface, or by a plate transducer, which is provided on or at the emitting surface.

In one embodiment, the transducer comprises a needle transducer, which extends through the cavity and unto the emitting surface. In particular, the needle transducer can extend through the excitation surface, the cavity, the diffuser or the diffuser and unto the emitting surface. To this end, suitable openings can be provided in the excitation surface and the diffusers.

The contact of the needle transducer with the emitting surface results in a good coupling of an acoustic wave that is received at the emitting surface. In this embodiment, the received acoustic wave does not need to travel through the medium to the excitation surface in order to be detected. Thereby, there is less attenuation and delay of the signal.

In particular, the needle transducer can be used for the purpose of picking up a sound signal from a fluid or other kind of medium that is probed by the wide angle transducer. The needle transducer may also be used to generate an acoustic signal although preferentially the acoustic signal is generated at the excitation surface such that it is reflected by the emitting surface, travels back and forth between the excitation surface and the emitting surface and is diffused by the diffuser or by the diffusers. For this purpose, a second transducer element can be provided at the excitation surface.

Alternatively or in addition to the needle transducer, a plate transducer can be provided at the emitting surface for picking up the acoustic signal. In this case, suitable conducting strips, regions or cables can be provided on or at the casing which allow to connect the plate transducer to a signal processing unit.

In particular, the transducing element or the transducing elements can comprise a piezoelectric element. In particular, some or all of the transducer elements can be provided by piezoelectric elements. The piezoelectric elements can provide an effective voltage-to-sound coupling. Moreover, piezoelectric elements can be easily available on the market, at least when they are provided in certain standard shapes, such as plate or column shapes.

According to a further embodiment, the transducer comprises not only one transducer element but three. Thus, transducer comprises a first transducer element, a second transducer element and a third transducer element. The first transducer element is provided for picking up an acoustic signal, while the second transducer element and the third transducer element are provided for generating an acoustic signal. To this end, the second and the third transducer elements are provided at the excitation surface while the first transducer element is in contact with the emitting surface.

In one embodiment, the first transducer element is arranged in a central position of the emitting surface. If the first transducer element extends to the excitation surface it can furthermore be provided in a central position of the excitation surface. The second and third transducer elements can be provided as flat transducers, for example as coin shaped transducers, which are arranged on an outer surface or an outer portion of the excitation surface.

More specifically, the first transducer element can be provided by a needle transducer, which extends through the cavity and unto the emitting surface. As mentioned above, the needle transducer can also extend through the excitation surface and the diffusers. Alternatively, the first transducer element can be provided as a plate transducer at the emitting surface.

According to one embodiment, the second transducer element and the third transducer element are arranged symmetrically to the first transducer element. This arrangement can provide well-defined conditions and can make good use of the available space on the excitation surface. In particular, they can be provided symmetrical in a plane of the excitation surface.

Moreover, the first transducer element, the second transducer element and the third transducer element can be arranged along a diagonal of the excitation surface. If the transducer elements are provided with a standard cross section, such as a round or a rectangular cross section the cross section of the transducer elements can be made large when the transducers are lined up along the longest extension of the excitation surface.

According to a further embodiment, the transducer comprises two transducer elements, one needle transducer as described above and one flat transducer which is provided on an outer surface of the excitation surface.

In a further aspect, the present specification discloses a measurement system, which comprises a computation unit with a waveform generator and the abovementioned wide angle transducer. The computation unit is operative to send a measuring signal from the wide angle transducer to receive a response signal from a second transducer, and to derive a measurement result from the response signal. More specifically, the computation unit and the waveform generator generate a suitably shaped electric signal, which is transmitted by electric cable to a transducer element of the wide angle transducer and from there to the excitation surface.

In particular, the response signal of the other transducer can be picked up by a transducer element that is mechanically coupled to the emitting surface, such as the abovementioned needle transducer. The transducer element converts the response signal into an electric signal that is transmitted to the computation unit by electric cable. The computation unit evaluates the electric signal in order to obtain the measurement result.

According to a further type of measurement, the computation unit also receives and evaluates a second response signal from the other transducer. This second response signal corresponds to an acoustic signal that is sent from the wide angle transducer to the other transducer in the opposite direction as the acoustic signal that corresponds to the first response signal.

In a further aspect, the current application discloses a computer-implemented method for obtaining a measurement result relating to a liquid or fluid in a conduit by means of the abovementioned wide angle transducer, wherein the conduit can be an open conduit or a closed conduit.

The liquid or fluid to be measured provided with a motion with respect to the transducer. A measuring signal is applied to one or more transducer elements of the transducer. In particular, for the abovementioned three transducer arrangement, the measuring signal is applied to the second transducer and to the third transducer.

Through respective mechanic coupling or contact between the transducer element, the excitation surface and the acoustic diffuser, the measuring signal is transmitted to the acoustic diffuser at the excitation surface of the transducer. In an embodiment without diffuser at the excitation surface, the measuring signal is transmitted to the excitation surface and into the transmitting medium of the cavity, which is a liquid or gel.

The measuring signal is transmitted into the transmitting medium and onto the second acoustic diffuser, which is attached to the emitting surface of the transducer. Thereby, the acoustic waves are reflected back and forth between the first diffuser and the second diffuser and a portion of the acoustic waves is emitted at the emitting surface into the liquid or fluid to be measured.

A response signal is received at a second transducer. The second transducer can be positioned with an offset relative to the wide angle transducer and to a longitudinal direction to the conduit. The second transducer may in particular be provided by a wide angle transducer. A measurement result relating to the fluid is derived from the first response signal by means of a computation unit.

In the measurement arrangement, the second transducer is mounted to the conduit at a first position and the second transducer is mounted to the conduit with an offset relative to the first position with respect to a longitudinal direction of the conduit.

In a further type of measurement, the method comprises the further steps of sending a second measuring signal, which may have the same signal shape as the first measuring signal from the second transducer to the abovementioned wide transducer.

The second response signal to the second measuring signal is received by a transducer element of the wide angle transducer, and the computation unit derives a measurement result relating to the fluid from the first response signal and the second response signal.

In a further aspect, the current application discloses a method for producing a transducer. A casing is provided, which is made from a plastic material or a metal material. A first diffuser is produced by a 3D metal printing process. The first diffuser is provided at an emitting surface of the casing.

Furthermore, a second diffuser can be produced by the 3D printing process and provided at an excitation surface of the casing, the excitation surface being opposite to the emitting surface. In particular, the first diffuser and/or the second diffuser can be provided on the respective surface by gluing, welding, soldering, screwing, riveting or by manufacture in one piece with the casing.

A transducer element is provided at the excitation surface of the casing. For example, the transducer element or the transducer elements can be provided by gluing, welding, soldering and/or a mechanical fit, such as press fit or form fit. Furthermore, a second transducer can be provided in contact with the emitting surface or at the emitting surface for picking up an acoustic signal.

Furthermore, the present specification discloses a transducer arrangement of at least two wide-angle transducers for performing a flow speed measurement. Specifically, the present specification discloses a transducer arrangement of at least two wide-angle transducers for performing a flow speed measurement using a time reversed signal.

More specifically, a transducer arrangement is disclosed that comprises a first wide-angle transducer according to one of the embodiments and a second wide-angle transducer according to one of the embodiments, a signal generating unit and a signal processing unit. The signal generating unit and the signal processing unit are realized with electronic components, such as circuits and integrated circuits.

The signal generating unit is connected to the first transducer and to the signal processing unit, and the signal processing unit is connected to the second transducer.

The first transducer, the second transducer, the signal generating unit and the signal processing unit are configured to apply a predetermined first signal to the first transducer, such as a time focused impulse signal, to receive a response signal of the predetermined first signal at the second transducer, to derive a measuring signal from the response signal, the derivation of the measuring signal comprising selecting a signal portion of the response signal or of a signal derived therefrom and reversing the signal portion with respect to time, to store the measuring signal for later use in an electronic memory component, to apply the measuring signal to the first transducer, to receive a response signal to the measuring signal at the second transducer, and to derive a flow speed from the received response signal to the measuring signal.

In a further embodiment, which uses a two-way flow speed measurement, which can be used to cancel out a temperature dependence, the signal generating unit is furthermore connected to the second transducer and the signal processing unit is furthermore connected to the second transducer.

The first transducer, the second transducer, the signal generating unit and the signal processing unit are configured to apply the measuring signal to the second transducer, to receive a second response signal to the measuring signal at the first transducer, to derive a flow speed from the received response signal to the measuring signal at the second transducer and from the received second response signal to the measuring signal at the first transducer.

BRIEF DESCRIPTION OF THE DRAWINGS

The subject matter of the present specification is now explained in further detail with respect to the following Figures, in which:

FIG. 1 shows a side view of a first embodiment of a wide angle acoustic transducer with two plate shaped transmitter elements and a column shaped receiver element, FIG. 2 shows a perspective view of an acoustic diffuser for an acoustic transducer, FIG. 3 shows a perspective view of a further wide angle acoustic transducer with a single transducer element and two diffusers, FIG. 4 shows a perspective view of a further wide angle transducer having three transducer elements and two diffusers, FIG. 5 shows a perspective view of a further wide angle acoustic transducer with one plate transducer element, a needle transducer and two diffusers, FIG. 12 shows an arrangement of clamp-on transducers for use with the embodiments of FIGS. 1 to 11, FIG. 13 shows a further arrangement of clamp-on transducers for use with the embodiments of FIGS. 1 to 11 in a V-configuration measurement, FIG. 14 shows the arrangement of FIG. 13 in a W-configuration measurement.

DETAILED DESCRIPTION OF THE PREFERRED EMBODIMENTS

Figure 6:
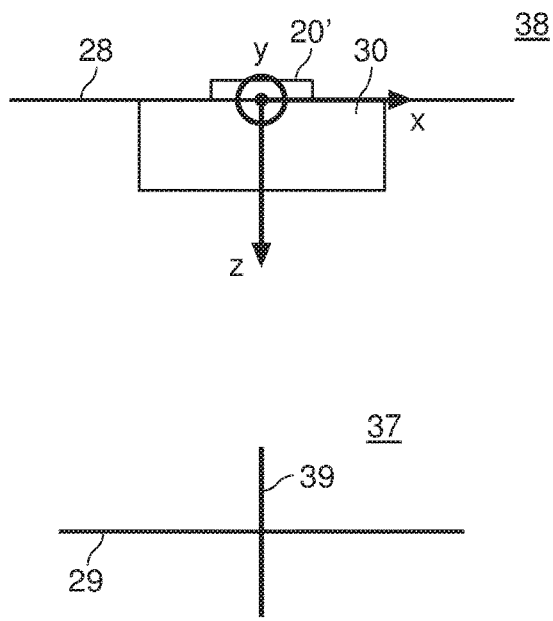
FIG. 6 shows an experimental setup for a pressure distribution measurement of an acoustic transducer.

In the following description, details are provided to describe the embodiments of the present specification. It shall be apparent to one skilled in the art, however, that the embodiments may be practised without such details.

FIG. 1 shows a cross sectional view of a wide-angle transducer 10 according to a first embodiment. The wide-angle transducer 10 comprises a casing 11, which encloses a cavity 12. A first plate shaped transducer element 13 and a second plate shaped transducer element 14 are provided on an excitation surface 15 of the casing 11. The transducer elements have connections for connecting the transducer elements to an electric power source, which are not shown in FIGS. 1, 3, 4 and 5.

In particular, the transducer elements of this embodiment and of the following embodiments can be provided by piezoelectric ceramics. According to specific embodiment, which was used to obtain the pressure curves, one or more 1 MHz piezoelectric discs with a diameter of 2 cm are glued to the flat back of the acoustic diffuser with a thin layer of epoxy. Silicone gel is applied to the other side of the piezoelectric disc for electrical insulation.

An acoustic diffuser 16 is provided on the inside of an emitter surface 17 of the casing 11, which is opposite the excitation surface 15. The diffuser 16 is shaped such that it provides a diffuse reflection of a soundwave emitted by the transducer elements 13 and 14. Furthermore, the diffuser 16 is shaped such that the acoustic modes of the cavity 12, which would otherwise lead to standing waves within the cavity 12, are suppressed. In the example of FIG. 1, the diffusor 16 is a chamber type diffusor, such as a Schroeder diffuser.

Examples of such diffusers include, among others, a Schroeder diffuser or quadratic residue diffuser (QRD), a cubic residue diffuser (CRD), a primary root diffuser (PRD) and a column type diffuser with statistically distributed heights. In one embodiment, which is particularly suitable for 3D printing, the diffuser is a column type diffuser with rectangular columns that have statistically distributed heights.

In the example of FIG. 1, the cavity 11 has the shape of a rectangular block, which is bounded by side walls 15, 17, 18 of the casing 11. The side walls 15, 17, 18 of the casing 11 comprise the excitation surface 15, the emitter surface 17, a first lateral surface 18, a second lateral surface 19 and third and fourth lateral surfaces which are not shown in FIG. 1.

A needle transducer 20 of the wide angle transducer 10 is coupled to the emitting surface 17 and extends through the cavity 17 and the excitation surface 17 and protrudes from the excitation 15 surface towards the exterior of the casing 11. In the example of FIG. 1, the needle transducer 20 is provided in a central position of the emitting surface 17 and the needle transducer 20 extends through the emitting surface 17.

In other embodiments, the needle transducer 20 can be coupled to the emitting surface 17 in other ways. For example, the needle transducer may be welded or glued to an inner surface of the emitting surface 17. Alternatively, the emitting surface 17 may comprise a reception portion with a suitable shape for taking up the needle transducer 20.

The cavity 12 is filled with an amorphous sound transmitting medium 21 such as a liquid or a gel or epoxy or other relevant material. Preferentially, the speed of sound in the transmitting medium is greater than the speed of sound in air and smaller than the speed of sound in the casing 11. Furthermore, the sound attenuation and the compressibility of the sound transmitting medium are substantially smaller than the sound attenuation and the compressibility of air.

In many materials, the sound attenuation depends on the dynamic viscosity, the bulk viscosity of the material and the sound frequency, whereas the speed of sound depends on the compressibility of the material. However, the sound attenuation of sound transmitting materials, such as the sound transmitting medium 21 may also be characterized by the compressibility of the material. In order to avoid corrosion of the interior space of the wide angle transducer, the transmitting medium can be provided by a non-corrosive fluid such as oil.

FIG. 2 shows a further embodiment of an acoustic diffuser 16' the acoustic diffuser is provided by an array of columns 25, which have statistically distributed heights with respect to a base portion 26. Each pillar or column 25 has a square cross-section and is connected to the base portion platform 26, which has a rectangular shape. The array of columns is also known as a "Manhattan", "terrain" or "skyline" structure. By way of example, the statistical height distribution may be generated by a random sequence generator. The range of random numbers is restricted between a minimum and a maximum height, which is sufficient to provide a diffuse reflection.

The acoustic diffuser 16' of FIG. 2 is a 3d-printed acoustic diffuser constructed with multiple pillars of different length. The acoustic diffusor comprises closely packed metal pillars with a random height. Each pillar has square cross-section, and is connected to a platform of rectangular shape.

The random sequence that determines the height distribution may be a pseudo random sequence generated by an algorithm or it may be a real random sequence generated by a hardware random number generator using a quantum mechanical measurement such as shot noise or some other physical random process such as thermal noise. For example, the random heights could be selected according to a uniform distribution, a Gaussian distribution, a Poisson distribution or some other form of statistical distribution.

In a terrain design of an acoustic diffuser the upper and lower frequency limits are defined by the width and height of the square columns, respectively. The height of the columns defines the lower frequency boundary, while the upper frequency boundary is defined by the width of the column. In specific examples, the height range of the columns or pillars may be chosen between 1 mm and 10 mm, the dimensions of the base surface or "foot print" may be chosen as 3.8 cm×3.8 cm, and the column width may be chosen as 1 mm or 2 mm. Thereby, the diffuser has an array of 38×38=1444 columns or, respectively, of 19×19=361 columns.

The acoustic diffuser 16, 16' is preferentially made from a metallic material, which provides a good coupling to the emitting surface. In particular, the diffuser 16, 16' can be made by a 3D metal printing. Suitable processing for 3D metal printing include, among others, metal sintering or melting and in particular selective laser sintering (SHS), direct metal laser sintering (DMLS), selective laser melting (SLM), electron beam melting (EBM), powder bed and inkjet head 3D printing (3DP), Fused deposition modelling (FDM) or Fused Filament Fabrication (FFF), Robocasting or Direct Ink Writing (DIW) and electron beam freeform fabrication (EBF3).

The current 3D printing technology is able to print structure as small as tens of micron in a size suitable for high frequency time reversal acoustics applications. It is suitable to manufacture complex surface structures. For a mass production molds could be used and the structure could be hot pressed or molded. The wide angle diffusor that was used for the experiments may be produced as follows.

First, a volumetric model of the acoustic diffuser is generated with a computational geometry programming language, such as OpenSCAD. By way of example, the wide angle transducer of the pressure measurements has a support surface of 3.8 cm×3.8 cm which is decorated with vertical pillars of square cross-section, which is 1 mm by 1 mm and 2 mm by 2 mm wide. The height of the columns is generated randomly. For the diffuser of the pressure measurement, a uniform distribution with values ranging between 1 mm and 10 mm was used. For printing, the geometry may be exported in a standard file format, such as STL, and is converted into a printable file, which is suitable for printing with a 3D metal printer.

By way of example, the 3D metal printer for generating the diffuser that was used in the pressure measurements utilizes a 100 W infrared fibre laser with a focus diameter of 40 micron to sinter austenitic stainless steel powder of 50 micron.

FIG. 3 shows another embodiment of a wide angle transducer 10'. The wide angle transducer 10' comprises two acoustic diffusers 16', 36 facing each other. The acoustic diffusers 16 and 36 are column type diffusers, as shown in the previous FIG. 2. For the sake of clarity, FIGS. 3 and 4 show only a portion of the second diffuser 36. The second diffusor 36 can be seen best in the cross sectional view of the embodiment of FIG. 5. For brevity, some explanations of features which are common to the embodiments are not repeated again in the description of FIGS. 3, 4 and 5.

The first acoustic diffuser 16' is provided at the emitting surface 17 of the wide angle transducer 10'. The second acoustic diffuser 36 is provided at the excitation surface 36, which is opposite to the emitting surface 17. Different from the embodiment of FIG. 1, the wide angle transducer 10' comprises only a single plate transducer 20' which is used both for emitting and for receiving acoustic waves.

In a transmitting mode, the plate transducer 20' is supplied with an electric signal and converts the electric signal into an acoustic signal, which is transmitted to the excitation surface 15 and to the second diffuser 36. From there, the signal is transmitted into the medium 21 and to the first diffuser 16'. A portion of the signal is emitted at the emitting surface 17 and another portion is reflected back into the medium 21.

The reflected acoustic signal is reflected back and forth between the first diffuser 16' and the second diffuser 36 until it is dissipated. Every time the first diffuser 16 receives an acoustic signal it emits part of it at the emitting surface 17. The emitting surface 17 is either in direct contact with a fluid or is coupled to it and emits the acoustic wave into the medium. In the context of the present specification, a fluid can be a liquid like oil, water, mixtures thereof or also a gas like oil, petroleum gas or mixture thereof. Generally speaking, a leaky cavity is formed, which is driven by one or several transducer elements, such as piezoelectric ceramics, which are attached to the flat back of one of the two diffusers 16, 36.

In a receiving mode, the plate transducer 20' receives an acoustic signal, which is transmitted from the emitting surface 17 to the diffuser 16 and into the medium 21. Furthermore, the plate transducer 20' receives signal portions that have been reflected back and forth between the diffuser 16, the walls of the casing 11 and the second diffuser 36.

FIG. 4 shows a further embodiment of a wide angle transducer 10" in which three plate transducers 13, 14, 20' are provided in a row along a diagonal of the excitation surface 15. One of the transducers 20', which is used as a transmitter, is provided centrally on the excitation surface 15. The two other transducers 13, 14 are provided on either side of the transducer 20'.

FIG. 5 shows a cross sectional view of a wide angle transducer 10, which is similar to the transducer 10 of FIG. 1 in that the centrally arranged transducer element 20 is provided as a needle transducer 20. In FIG. 5, the needle transducer 20, the diffuser 16 and the casing 11 are shown in cross section.

Similar to the embodiments of FIGS. 3 and 4 and different from the embodiment of FIG. 1, two column type diffusers 16, 36 are provided at opposite sides of the cavity. Similar to the embodiment of FIGS. 1 and 4 and different from the embodiments of FIG. 3 there are three transducer elements 13, 14, 20, which are arranged along a diagonal of the excitation surface 15. The first transducer element is not shown in the view of FIG. 5. In principle, the transducer elements 13, 14, 20' could be arranged in other patterns but the pattern of FIG. 4 allows to achieve a large surface of circular shaped transducer elements and an effective coupling to the excitation surface 15.

FIG. 6 shows a schematic configuration of an experimental setup that is used for determining the pressure distribution of a wide angle transducer 30 according to FIGS. 7 to 11. The wide angle transducer 30 refers to one of the wide angle transducer 31, 32, 33, 34 shown in the insets of FIGS. 7, 8, 9, 10 and 11, respectively. The acoustic diffuser 30 is submerged in water 37 in an upright position.

The water 37 is contained between the boundaries of a container or a duct, which are indicated by the boundary lines 28 and 29. For the purposes of this measurement, the water is at rest and is not flowing relative to the boundaries 28, 29.

A piezoelectric ceramic 20' is attached to the wide angle transducer 30 and is backed by air 38 in order to have an efficient coupling of the signal into the water 37. A needle hydrophone 39, which is arranged at the boundary 29 in upright position and opposite to the wide angle transducer 37 is used to measure the acoustic pressure. The coordinates are chosen at water surface with the origin placed at the center of the piezoelectric ceramic. The X- and Y axes are lateral to the surface of the transducer and the Z-axis increases with normal distance from the transducer 30. For the purpose of the pressure diagrams of FIGS. 7 to 11, only the X-coordinate, which is parallel to the boundary 29, is used.

The needle hydrophone 39 is moved in steps along the X-coordinate to pick up the sound signal from the wide angle transducer 30. In FIG. 6, the needle hydrophone 39 is shown in a position opposite to the centre of the wide angle transducer 30. As mentioned further below, a distance between the hydrophone and the front side of a plate, which serves as an emitting surface, is 150 mm.

The acoustic diffusors are mounted inside a plastic housing, which allows inserting one or two of them. By way of example, this is shown in FIGS. 3, 4 and 5. The housing is in turn connected to a stainless steel rod and fixed in place at the free surface of a water filled basin made of transparent acrylic, see FIG. 6.

In a technical application, the boundary 28 will usually be provided by a wall, such as a conduit wall. In an open channel configuration, the transducer is provided at a free surface. For the purpose of measuring only one direction of the acoustic signal and for ease of placement of the wide angle transducer it is sufficient to measure in an open channel configuration.

By placing the transducer at the water surface, the piezo element 20' becomes air-backed which increases the pressure amplitude transmitted into water. The signal is generated with an arbitrary waveform generator, fed to 55 dB RF amplifier (350 MHz bandwidth, ENI) and connected directly to the piezoelectric element 20'.

For measurements of the spatial pressure distribution a single cycle at 1 MHz with a peak-to-peak voltage of 80 Volt is applied to the piezo element 20'. The acoustic signals are measured with a small hydrophone 39 with a circular polyvinylidenefluoride (PVDF) sensor. While the emitter/receiver is at a fixed location the position of the hydrophone 39 is moved with a programmable translation stage. When scanning the sound field the hydrophone is translated in steps of 0.5 mm where y=0, x is varied between −100 mm and 100 mm and z=150 mm.

The measurement is automated. After the positioning of the hydrophone 39, the electric signal is generated from a control computer, uploaded to the arbitrary waveform generator, triggered and then captured with a 14-bit sampling oscilloscope. The signals are then transferred to the computer and stored.

To investigate the impact on the decoration of the plate on the spatial scattering, the spatial pressure distribution of two different terrain structures were studied. A flat plate of thickness 6 mm served as a comparison.

Figure 7:
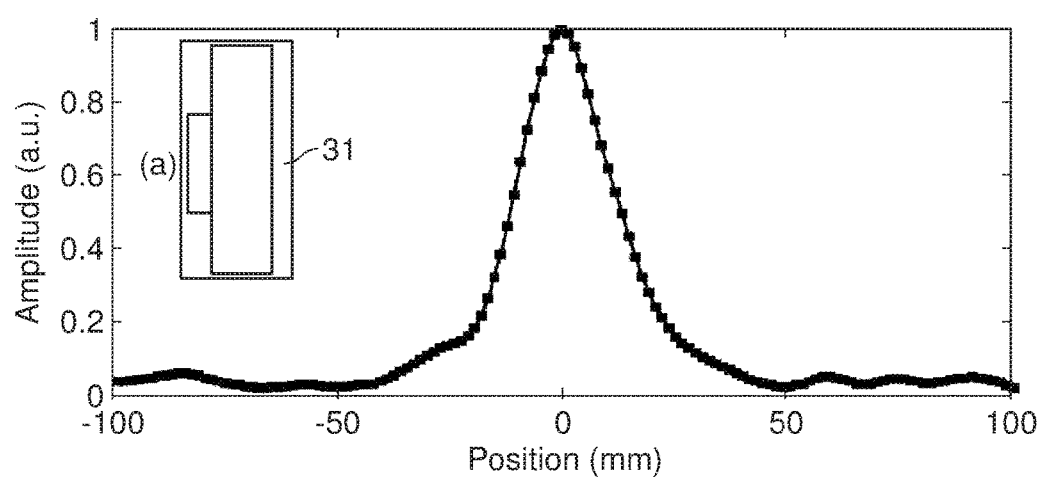
FIG. 7 shows a pressure distribution of an acoustic transducer with a rectangular cavity.
Figure 8:
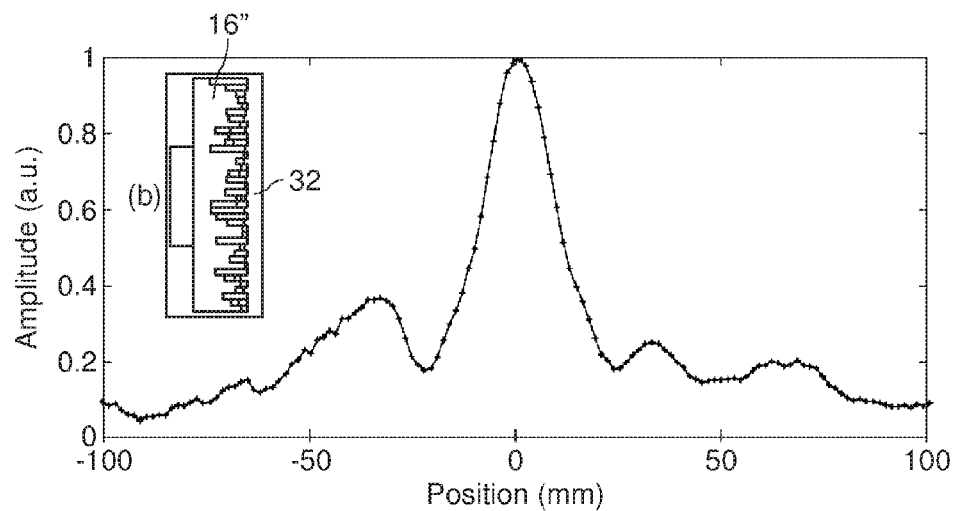
FIG. 8 shows a reference pressure distribution of an acoustic transducer having a cavity with a diffuser having a small column size.
Figure 9:
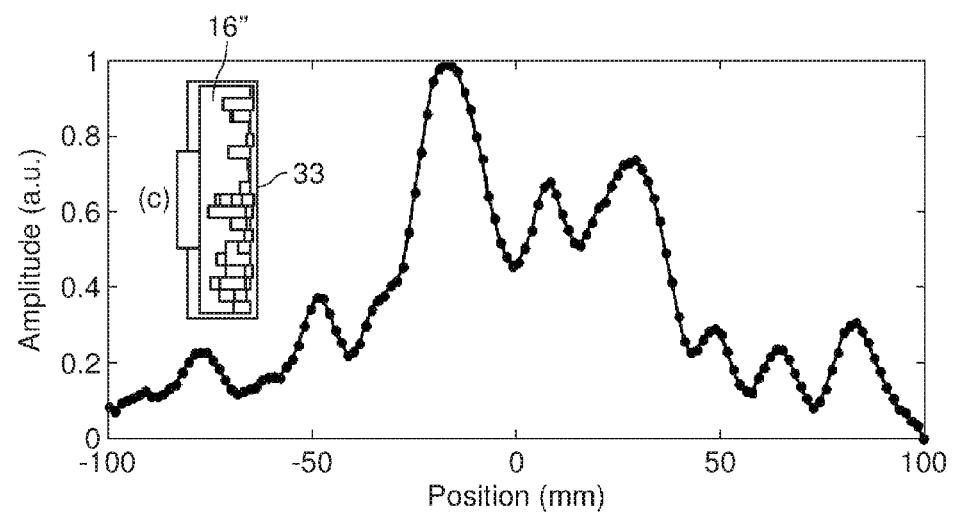
FIG. 9 shows a pressure distribution of an acoustic transducer having a cavity with a diffuser having a larger column size.

The FIGS. 7, 8 and 9 show the spatial distributions of the maximum positive pressure measured at a distance of 150 mm from the front side of the plate for three distinct configurations: a flat plate in FIG. 7, a diffuser with a terrain structure with 1 mm pillar size in FIG. 8, and diffuser with a terrain structure with 2 mm pillar size in FIG. 9.

FIG. 7 shows a reference pressure distribution created by a wide angle transducer having just a cavity and no diffuser. As can be seen in FIG. 7, the flat plate provides a symmetric and narrow beam with a single distinct peak having a full width at half maximum (FWHM) of 26 mm.

FIG. 8 shows a pressure distribution created by a wide angle transducer having a single column type diffusor with a smaller column base size of 1 mm by 1 mm. In the arrangement of FIG. 8 there is a strong difference on the spatial pressure distribution using the terrain structure of 1 mm pillar size as compared to FIG. 7. Several side lobes are prominently visible. Yet the FWHM of the main peak at 25 mm, has not significantly changed.

FIG. 9 shows a pressure distribution created by a wide angle transducer having a single column type diffusor with a larger column base size of 2 mm by 2 mm. The pressure distribution of FIG. 9, which was obtained with a diffuser having a terrain with 2 mm pillar size is significantly different. In particular, the distribution in the centre region is different, it appears to consist of three peaks of approximately similar amplitude spanning around 80 mm at FWHM. This measurement suggests that the terrain diffuser with the larger pillar size will perform better within the leaky cavity.

Figure 10:
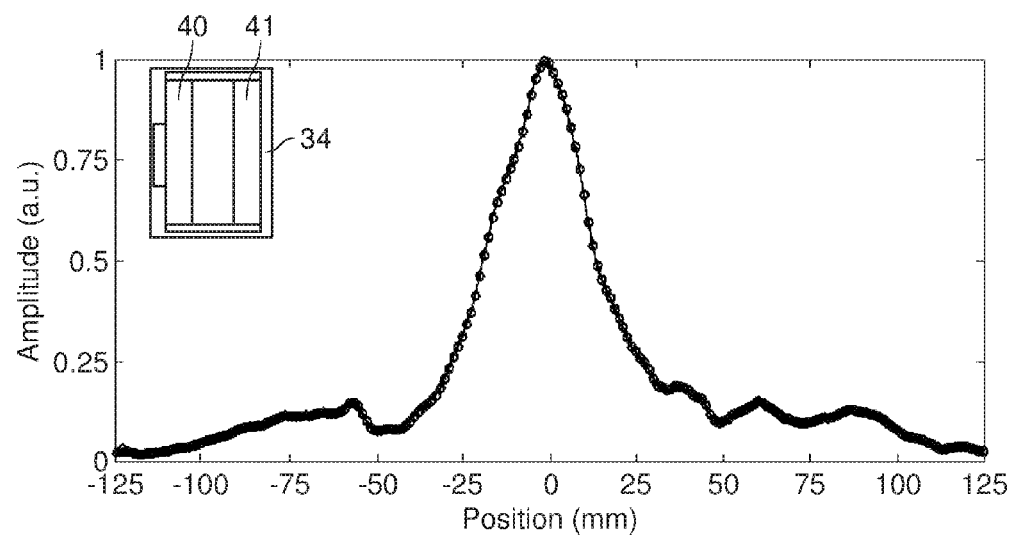
FIG. 10 shows a reference pressure distribution of an acoustic transducer having a rectangular cavity.
Figure 11:
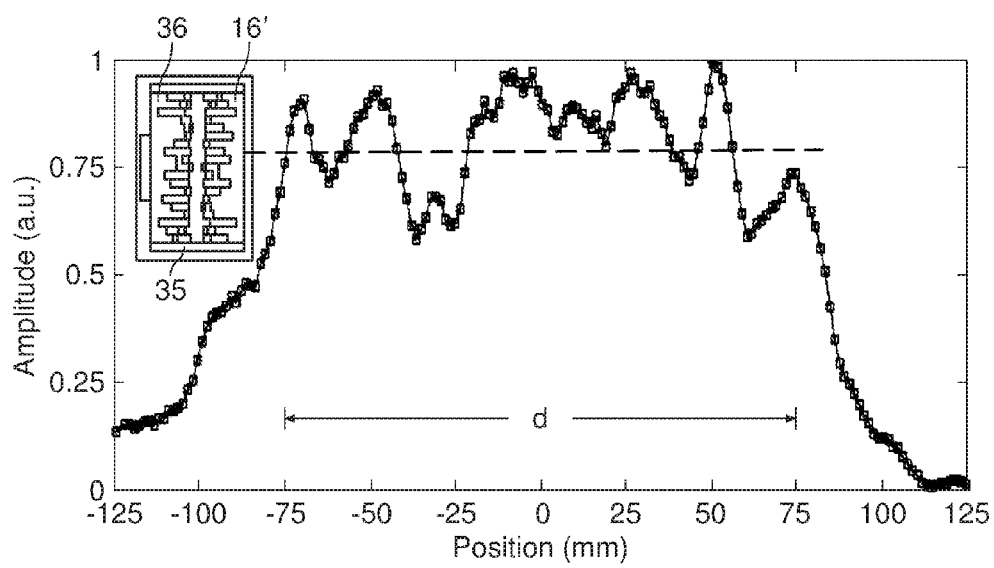
FIG. 11 shows a pressure distribution of an acoustic transducer with two diffusers facing each other.

For the pressure measurements of FIGS. 10, 11 and 12, a reverberation cavity was constructed. Thereby, the acoustic diffuser can also be used as a receiver.

To obtain a compact design, two parallel diffuser plates are embedded into the cavity with their terrain surface facing each other. An ABS made plastic holder fixes and aligns the plates such that there remains a gap between the tallest pillars. This gap is filled with water. However, in other embodiments the cavity can be filled with any other acoustic transparent material, such as a gel etc.

Care is taken that no gas bubbles become enclosed, which could lead to undesired effects, such as cavitation. Therefore, prior to assembly the diffusers are kept in water under low pressure inside a vacuum chamber and the water is degassed. The diffusers are assembled into the cavity while remaining submerged. The final structure of the transducer, namely the pillar cavity, has a dimension of 4 cm×4 cm×2.5 cm. For reference purposes, the performance is performed with a cavity formed by two undecorated plates of 6 mm thickness each, which is also referred to as "flat cavity".

During the pressure measurements, the large mismatch in acoustic impedance between steel and water results in a high Q-value of the cavity, which is needed for the desired long reverberation times. In other words, a high density contrast leads to a high reflection rate.

In FIGS. 10 and 11, the pressure distribution of the respective cavities is measured to confirm a wide spatial emission. As before in the measurements of FIGS. 7, 8 and 9, a single cycle 1 MHz signal is used but the scan range is increased to −125 mm≤x≤125 mm and z=150 mm of the hydrophone. The measured distribution of the maximum pressure emitted from the cavities is depicted in FIGS. 10 and 11.

FIG. 10 shows a reference pressure distribution created by a wide angle transducer having a cavity which is bounded by two flat or undecorated plates 40, 41. The FWHM of the flat cavity of FIG. 10 is about 33 mm.

FIG. 11 shows a pressure distribution created by a wide angle transducer similar to the one shown in FIG. 3, which has diffuser plates 16', 36 that are facing each other. Compared to the FWHM of the pressure distribution of FIG. 10, the terrain cavity of FIG. 11 displays a nearly 5-fold increased FWHM of 145 mm. Thus, the FWHM extension is much larger than the width of the diffuser base, which is 3.8 cm=38 mm. Overall, the cavity transducer with the terrain surfaces greatly enhance the spatial spreading while maintaining a compact form.

An opening angle α of the trapezoid, which is formed between the pressure FWHM as first base line and the plate surface as second base line, may be defined by $$\alpha = \sin^{-1}\left(\frac{145\,mm - 38\,mm}{2} * \frac{1}{150\,mm}\right) \approx 20.9°$$

Generally, the time resolution will be limited by the damping time of the cavity.

FIG. 12 shows an arrangement of two clamp-on transducers 10. The arrangement of FIG. 12 and the arrangements of the following FIGS. 13, 14, 15, 17 can be used with the wide-angle transducers 10, 10', 10", 10''' of FIGS. 1 to 11.

A flow direction is indicated by a horizontal arrow and travel paths of acoustic signals is indicated by two diagonal arrows.

FIG. 13 shows a further arrangement of clamp-on transducers 110 for use with the embodiments of FIGS. 1 to 11 in a V-configuration measurement. The wide-angle transducers 10-10''' can be integrated into a clamp-on transducer 110 in various ways. For example, the wide-angle transducers 10-10''' can be arranged such that an excitation surface 15 coincides with an outer surface of the clamp-on transducer 110 and the opposite emitting surface 17 is adjacent to a wedge-shaped part of the clamp-on transducer 110.

FIG. 14 shows the arrangement of FIG. 13 in a W configuration measurement in which a dominant acoustic signal is reflected twice at the boundaries of a conduit before it reaches a second transducer.

Figure 15:
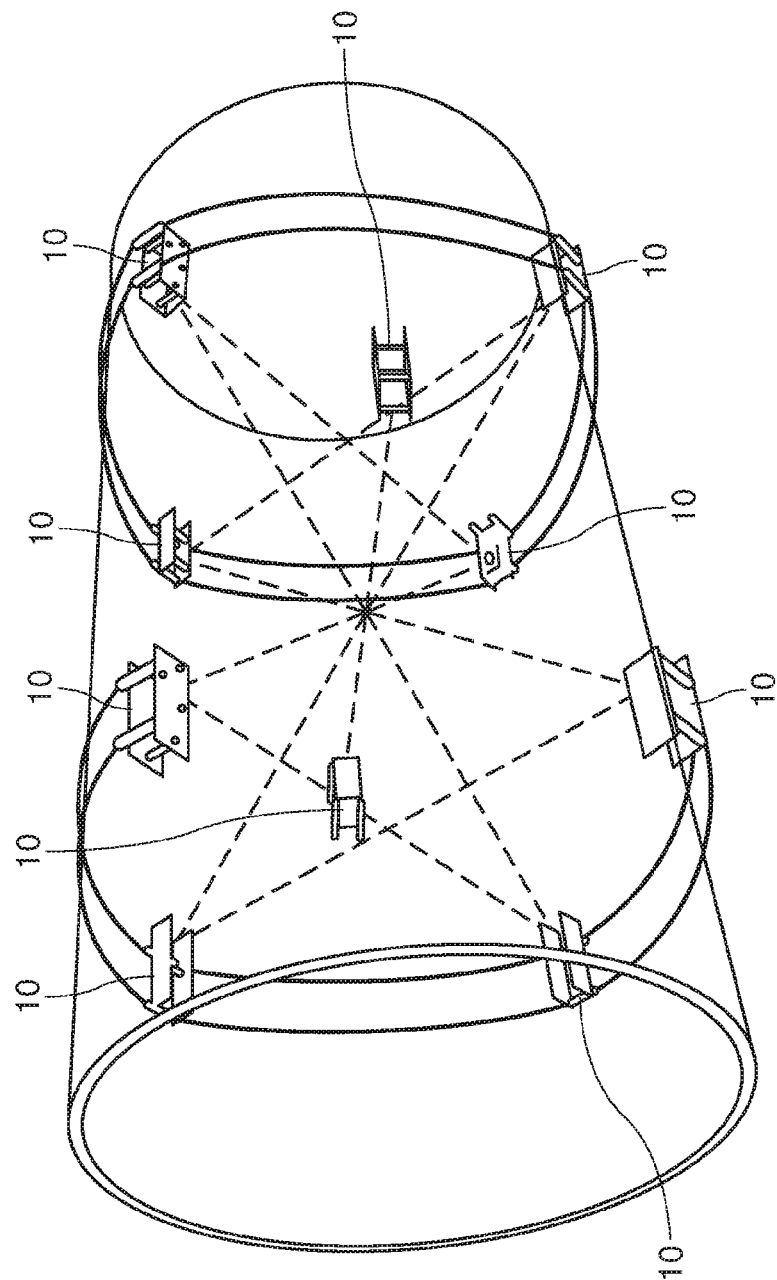
FIG. 15 shows a further arrangement of clamp-on transducers for use with the embodiments of FIGS. 1 to 11.

FIG. 15 shows a further arrangement of clamp-on transducers for use with the embodiments of FIGS. 1 to 11. In the example of FIG. 15 the wide-angle transducers 10 are fitted in to the clamp on transducers, which are clamped to a conduit by means of cables. In the arrangement of FIG. 15, is one set of four transducers, one intermediate set of two transducers and a further set of four transducers. Lines of sight between the wide-angle transducers 10 are indicated by dashed lines.

Figure 16:
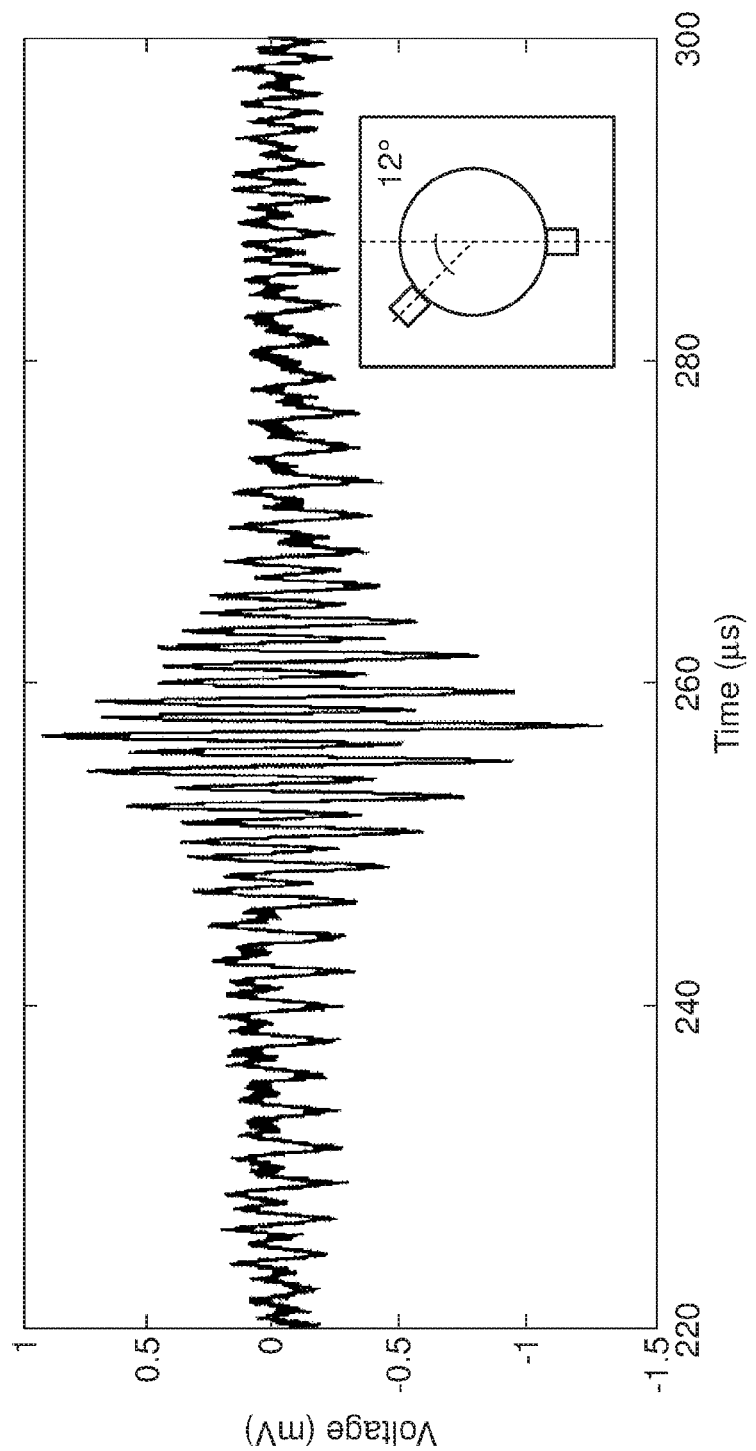
FIG. 16 shows a received signal in the arrangement of FIG. 12.

FIG. 16 shows a received signal in the arrangement of FIG. 12. The signal FIG. 15 illustrates the focusing properties of a wide-angle transducer in the time domain. A focusing in the time domain can be achieved by applying a time inverted signal at the sending wide-angle transducer 10.

A measuring signal according to the present specification can be modelled by a matched filter. If a sharply peaked impulse is used as a probe or test signal, the received signal at the transducer is the impulse response of the channel. The wide-angle transducers of the present specification can be used with or without time inverted signals. When a time inverted signal is used, an inverted version of a received signal is sent back through the same channel as a measuring signal, either in the reverse direction of a flow in a conduit or in the same direction as the flow.

This results in a signal with a peak at the origin, where the original source was, or in a signal with a peak at the original receiver, respectively. The signal is shaped with respect to space and time. The time focussing property is illustrated in FIG. 16, while the spatial shaping is illustrated in FIGS. 8, 9 and 11.

An ultrasonic flow meter according to the present specification can provide a focusing property by using the above-mentioned inverted signal, or a similarly shaped signal, for an ultrasonic flow meter to form a response signal, which is both concentrated in space and time. This in turn leads to a higher amplitude at a receiving piezoelectric element and a better signal to noise ratio.

With an ultrasonic flow meter according to the present specification, focusing and beam forming properties can be obtained under very general conditions. For example, a focusing property is obtained even when only one ultrasound transmitter is excited and even when the inverted signal is reduced to signal that is only coarsely digitized in the amplitude range, if the time resolution of the inverted signal is sufficient. Furthermore, a flow meter according to the present specification can be used with clamp-on transducers, which are easy to position on a pipe and do not require modifications of the pipe.

Figure 17:
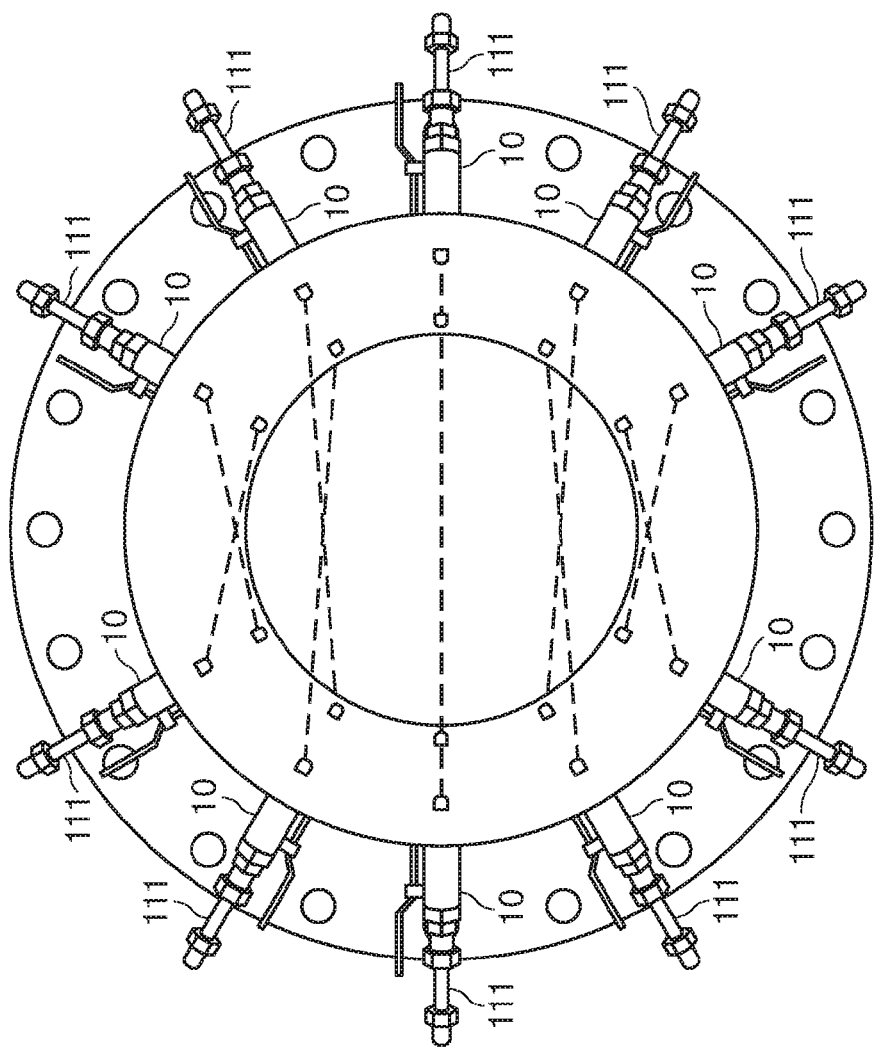
FIG. 17 shows an arrangement of wet transducers for use with the embodiments of FIGS. 1 to 11.

FIG. 17 shows an arrangement of wet transducers 111 for use with the embodiments of FIGS. 1 to 11. The wet transducers 111, which protrude into the conduit, comprise wide angle transducers 10. In the example of FIG. 17 there are altogether five layers of four transducers. Diagonal lines of sight within the same layer have been indicated by dashed lines. This arrangement is particularly useful for measuring the flow velocity in the different layers separately.

The arrangement can be best used in combination with wide-angle transducers of the present specification and beam shaping procedures. The beam shaping procedures are implemented by electronic components such as a signal generating unit and a signal evaluation unit, which is also known as a signal processing unit. In particular, the beam shaping may comprise the application a time inverted signal to a wide-angle transducer.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practise. Thus, the scope of the embodiments should be determined by the claims and their equivalents, rather than by the examples given.

REFERENCE 10 wide angle transducer
11 casing
12 cavity
13 transducer element
14 transducer element
15 excitation surface
16, 16' acoustic diffuser
17 emitting surface
18 first lateral surface
19 second lateral surface
20 transducer element
20' needle transducer
21 transmitting medium
25 columns
26 base surface
28 boundary line
29 boundary line
30 wide angle transducer
31 reference transducer
32 wide angle transducer, small column size
33 wide angle transducer, large column size
34 reference transducer
35 wide angle transducer, double sided
36 acoustic diffuser
37 water
38 air
39 needle hydrophone
40 flat plate
41 flat plate
110 clamp-on transducer
111 wet transducer

What is claimed is:

1. A transducer for emitting and receiving acoustic waves, the transducer comprising a casing, the casing forming a cavity, the casing comprising:
   an excitation surface and an emitting surface which is arranged opposite to the excitation surface,
   a transducer element, the transducer element being provided at the excitation surface,
   an acoustic diffuser, the acoustic diffuser being provided at the emitting surface of the casing, wherein a diffusing structure of the acoustic diffuser faces the cavity, and
   a second acoustic diffuser, the second acoustic diffuser being provided at the excitation surface, wherein a diffusing structure of the second acoustic diffuser faces the cavity.

2. The transducer of claim 1, wherein the diffusing structure of the second acoustic diffuser faces the diffusing structure of the first acoustic diffuser.

3. The transducer of claim 1, wherein the diffusing structure of the acoustic diffuser comprises a column type diffusing structure.

4. The transducer of claim 1, wherein the diffusing structure of the acoustic diffuser comprises a chamber type diffusing structure.

5. The transducer of claim 1, wherein the acoustic diffuser is made from a metallic material.

6. The transducer of claim 1, wherein the acoustic diffuser is made from a plastics material.

7. The transducer of claim 1, wherein the acoustic diffuser is made by a 3D printing process.

8. The transducer of claim 1, wherein the cavity is a rectangular cavity.

9. The transducer of claim 1, the transducer comprising a needle transducer, the needle transducer extending through the cavity and unto the emitting surface.

10. The transducer of claim 1, the transducer comprising a plate transducer that is provided at the emitting surface.

11. The transducer of claim 1, the transducer comprising a first transducer element, a second transducer element and a third transducer element, the second transducer element and the third transducer element being provided at the excitation surface and the first transducer element being in contact with the emitting surface.

12. The transducer of claim 11, wherein the first transducer element is a plate transducer, the plate transducer being provided at the emitting surface.

13. The transducer of claim 11, wherein the first transducer element is arranged in a central position of the emitting surface.

14. The transducer of claim 13, wherein the first transducer element, the second transducer element and the third transducer element are arranged along a diagonal of the excitation surface.

15. The transducer of claim 11, wherein the first transducer element is a needle transducer, the needle transducer extending through the cavity and unto the emitting surface.

16. The transducer of claim 11, wherein the second transducer element and the third transducer element are arranged symmetrically to the first transducer element.

17. The transducer of claim 1, wherein the transducer element comprises a piezoelectric element.

18. A transducer arrangement, the transducer arrangement comprising a first transducer and a second transducer, each according to claim 1, a signal generating unit and a signal processing unit, the signal generating unit being connected to the first transducer and to the signal processing unit, and the signal processing unit being connected to the second transducer,
    wherein the first transducer, the second transducer, the signal generating unit and the signal processing unit are configured to:
        apply a predetermined first signal to the first transducer,
        receive a response signal of the predetermined first signal at the second transducer,
        derive a measuring signal from the response signal, the derivation of the measuring signal comprising selecting a signal portion of the response signal or of a signal derived therefrom and reversing the signal portion with respect to time,
        store the measuring signal for later use,
        apply the measuring signal to the first transducer,
        receive a response signal to the measuring signal at the second transducer,
        derive a flow speed from the received response signal to the measuring signal.

19. The transducer arrangement of claim 18, wherein the signal generating unit is furthermore connected to the second transducer and the signal processing unit is furthermore connected to the second transducer,
    and wherein the first transducer, the second transducer, the signal generating unit and the signal processing unit are configured to:
        apply the measuring signal to the second transducer,
        receive a second response signal to the measuring signal at the first transducer,
        derive a flow speed from the received response signal to the measuring signal at the second transducer and from the received second response signal to the measuring signal at the first transducer.

20. Method of production of a transducer, comprising
    providing a casing, the casing defining a cavity,
    producing a column type acoustic diffuser by a 3D printing process,
    providing the column type acoustic diffuser on an emitting surface of the casing, such that the columns of the column type acoustic diffuser face the cavity,
    providing at least one transducer element at an excitation surface of the casing, the excitation surface being arranged opposite to the emitting surface,
    producing a second column type acoustic diffuser by a 3D printing process,
    providing the second column type acoustic diffuser at the excitation surface of the casing, such that the columns of the column type acoustic diffuser face the cavity.

21. A transducer for emitting and receiving acoustic waves, the transducer comprising a casing, the casing forming a cavity, the casing comprising:
    an excitation surface and an emitting surface which is arranged opposite to the excitation surface,
    a transducer element, the transducer element being provided at the excitation surface,
    an acoustic diffuser, the acoustic diffuser being provided at the emitting surface of the casing, wherein a diffusing structure of the acoustic diffuser faces the cavity;
    wherein the transducer comprises a needle transducer, the needle transducer extending through the cavity and unto the emitting surface.

22. A transducer for emitting and receiving acoustic waves, the transducer comprising a casing, the casing forming a cavity, the casing comprising:
    an excitation surface and an emitting surface which is arranged opposite to the excitation surface,
    an acoustic diffuser, the acoustic diffuser being provided at the emitting surface of the casing, wherein a diffusing structure of the acoustic diffuser faces the cavity;
    wherein the transducer further comprises a first transducer element, a second transducer element and a third transducer element, the second transducer element and the third transducer element being provided at the excitation surface and the first transducer element being in contact with the emitting surface.

* * * * *